United States Patent [19]

Loose et al.

[11] Patent Number: 4,666,662
[45] Date of Patent: May 19, 1987

[54] STEAM GENERATOR RECIRCULATING SYSTEM FOR A PRESSURIZED WATER NUCLEAR REACTOR

[75] Inventors: Robert A. Loose, Murrysville; James S. Schlonski, Monroeville, both of Pa.; Claude C. Steinkuhler, Bonlez, Belgium

[73] Assignee: Westinghouse Electric Corp., Pittsburgh, Pa.

[21] Appl. No.: 629,531

[22] Filed: Jul. 10, 1984

[51] Int. Cl.⁴ .................. G21C 19/42; G12D 5/00
[52] U.S. Cl. .................. 376/315; 376/211; 376/299; 376/316; 376/402; 60/644.1; 60/646; 60/653; 60/657
[58] Field of Search .......... 376/310, 315, 316, 282, 376/211, 283, 298, 299, 402; 60/644.1, 653, 646, 657

[56] References Cited

U.S. PATENT DOCUMENTS

| | | | |
|---|---|---|---|
| 3,938,473 | 2/1976 | Mayer et al. | 376/211 X |
| 3,972,772 | 8/1976 | Heitmann | 376/313 X |
| 3,976,541 | 8/1976 | Stiteler et al. | 376/310 |
| 4,157,939 | 6/1979 | Schabert et al. | 376/282 |
| 4,187,146 | 2/1980 | Shen et al. | 376/310 X |
| 4,231,328 | 11/1980 | Lang et al. | 376/211 X |

FOREIGN PATENT DOCUMENTS 55969 7/1982 European Pat. Off.

Primary Examiner—Harold J. Tudor
Assistant Examiner—John S. Maples
Attorney, Agent, or Firm—R. S. Lombard

[57] ABSTRACT

A steam generator recirculating system for use with the secondary coolant of the steam generators of a pressurized water nuclear reactor is comprised of two separate recirculation loops. Each loop contains a common discharge line into which a secondary coolant discharge line and blowdown discharge line from at least one steam generator feeds. The common discharge line contains a recirculating pump and a heat exchanger, with bypasses provided about each. The common discharge lines discharge into branch feedlines back to the steam generators. The system may also be used as a blowdown system leading to a steam generator blowdown processing system and may include a water purification means and used to purify the secondary coolant water. Cross-connecting lines are provided to permit optional use of a particular loop with various steam generators.

19 Claims, 3 Drawing Figures

STEAM GENERATOR RECIRCULATING SYSTEM FOR A PRESSURIZED WATER NUCLEAR REACTOR

BACKGROUND OF THE INVENTION

In pressurized water nuclear reactors for the production of power, a pressurized fluid, such as water, is circulated as a primary coolant through the reactor core and heat transferred from the primary coolants, through heat exchange tubes in the secondary side of a steam generator, to a secondary coolant flowing through the secondary side. In the secondary side of the steam generator, the heat so transferred produces steam that is then used to drive a turbine for the production of electrical power.

The steam generator has a main feedwater line from which secondary coolants, such as water, is fed to the secondary side of the steam generator for conversion to steam, and a steam dicharge line through which steam produced is directed to the turbine. An emergency feedwater line is also provided so as to transmit emergency secondary coolant to the steam generator following an accident or during a transient condition when the main feedwater system is not available, so as to provide a supplemental source of secondary coolant to the steam generator.

The steam generators are also provided with a blowdown system. This system is used to eliminate the concentration of impurities in the secondary side of the steam generator and normally comprises a blowdown discharge line that will discharge about one percent of the secondary coolant to a heat exchanger and then to a condensate demineralizer to remove impurities and then to a condensate tank for subsequent return to the main feedwater line to the steam generator.

In the event of a need to provide a cold shutdown of the reactor, residual heat and sensible heat contained in the core must be removed. Conventionally, a reactor coolant system is used, in conjunction with the steam generators so as to bring the plant temperature from a no load temperature to cold shutdown condition. Such a cold shutdown was normally to be accomplished in two phases; first, a transfer of reactor coolant system heat to the steam system, such as by the release of steam to the atmosphere or to a condenser in the steam system, in order to reduce the temperature of the primary coolant from about 285° C. to 175° C. within four hours after reactor shutdown; and second, initiation of a residual heat removal system that is conventionally provided so as to reduce the temperature to about 60° C. within twenty hours following the reactor shutdown. Under new regulations, the shutdown system must be capable of meeting cold shutdown as a safe plant condition after accident mitigation, and the use of safety grade equipment is required.

An object of the present invention is to provide a steam generator recirculating system that is usable to bring the reactor from a no load condition to cold shutdown condition with safety grade equipment.

Another object of the present invention is to provide a steam generator recirculating system that will recirculate the secondary coolant from the steam generator of a pressurized water reactor system to achieve uniform water chemistry.

A further object of the present invention is to provide a steam generator recirculating system that can also be used as a steam generator blowdown system or a water purification means to remove impurities from the secondary coolant water.

SUMMARY OF THE INVENTION

A steam generator recirculating system for use with the secondary coolant of the steam generators of a pressurized water reactor plant is comprised of a pair of recirculating loops that are preferably contained in physically remote areas. A discharge line for secondary coolant from each steam generator and a blowdown discharge line from each steam generator feed into a common discharge line, the discharge line containing a circulating pump and a heat exchanger, with the discharge from the common discharge line fed back to the steam generator or plurality of steam generators. A bypass line is provided around the heat exchanger that communicates with the common discharge line. A second bypass line is provided around the pump. The common discharge line has an offtake line that leads to the steam generator blowdown processing system for use when the system is used in a normal steam generator blowdown mode. The common discharge line may also communicate with a water purification means, such as an electromagnetic filter so that the system may be used in purification of the secondary coolant water.

The steam generator recirculating system is adaptable to two loop, three loop and four loop reactor arrangements. A cross-connecting line is provided between the two loops of the recirculating system such that either or both loops of the recirculating system may be used for one or a plurality of steam generator secondary coolant flows. Branch feedlines back to the steam generators are fed by the common dicharge line of the two loops and a cross-connecting line is provided such that secondary coolant discharge from each discharge line may be directed to a particular steam generator or plurality of steam generators.

A further embodiment includes a surge tank into which steam or saturated liquid from the main steam line of a generator may be discharged, which discharged steam after condensing may be passed to a demineralizer and returned to a condensate tank of the steam generator blowdown system.

DETAILED DESCRIPTION

Figure 1:
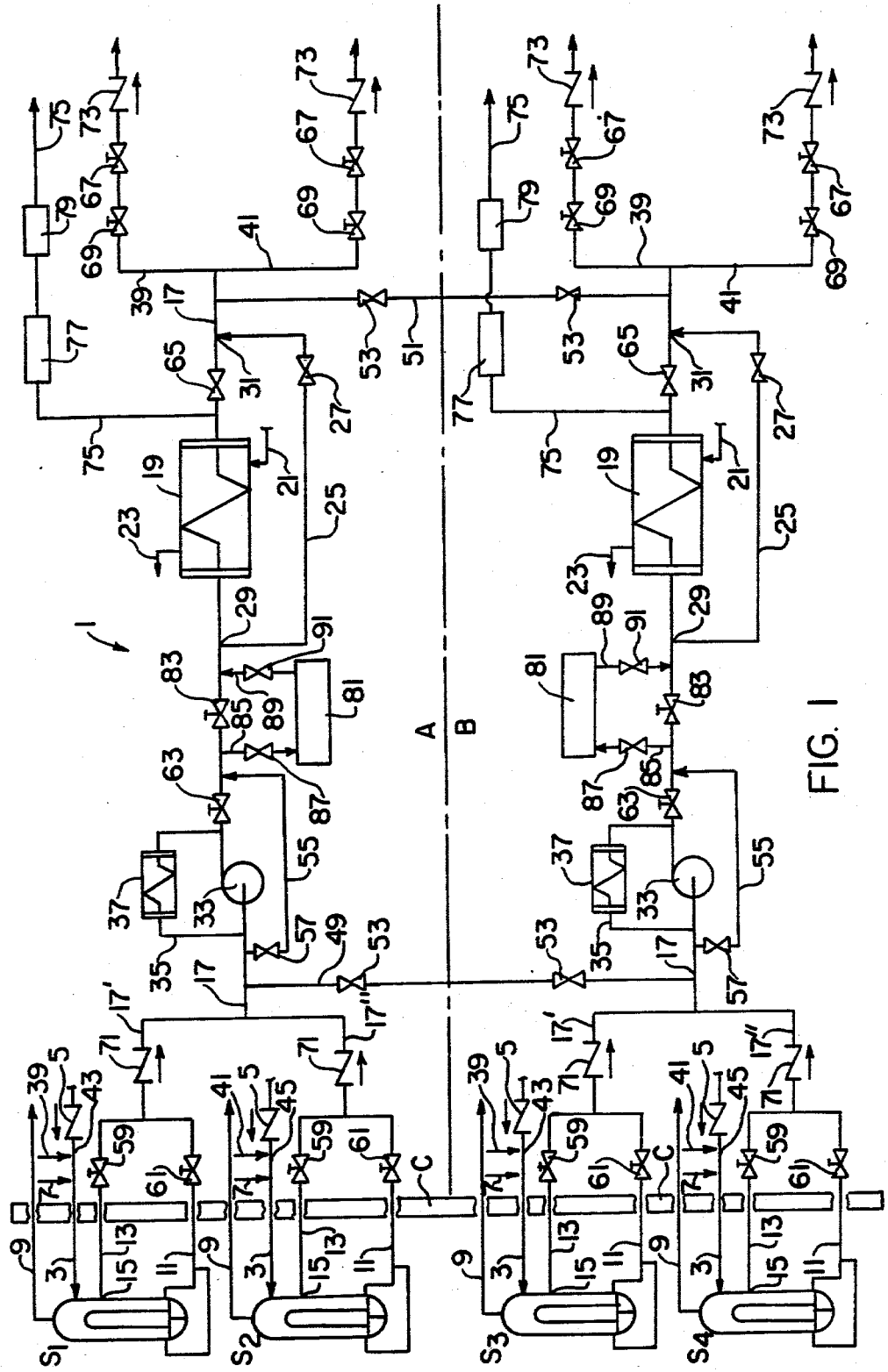
FIG. 1 is a schematic illustration of an embodiment of the steam generator recirculating system of the present invention for use with a pressurized water reactor plant having four steam generators.

Referring now to FIG. 1, there is schematically illustrated a steam generator recirculating system 1 of the present invention adapted for use in a four loop nuclear reactor steam supply system. In a four loop nuclear reactor steam supply arrangement, four steam generators $S_1$, $S_2$, $S_3$ and $S_4$ are provided to service the reactor, which is enclosed in a containment wall c. Each steam generator $S_1$, $S_2$, $S_3$ and $S_4$, as is conventional, has a main feedwater supply line 3 which contains a check valve 5 and connection to an emergency feedwater supply line 7. Also, each steam generator has a steam discharge line 9, and a blowdown system, including a blowdown discharge line 11. To each of the steam generators $S_1$, $S_2$, $S_3$ and $S_4$ there is added a secondary coolant discharge line 13 arranged to remove secondary coolant from the steam generator at a location adjacent the tube handle in the steam generator, through connection 15, such as a nozzle.

A pair of recirculating loops A and B, which are maintained in separate physical areas, each receive secondary coolant from two steam generators and, after treatment, return the secondary coolant to the respective generators. As illustrated, loop A is adapted to receive secondary coolant from steam generators $S_1$ and $S_2$ while loop B is adapted to receive secondary coolant from steam generators $S_3$ and $S_4$. Since the two loops A and B, while being located in distinct areas, contain the same components, the following detailed description will refer to the components of loop A, with the same component designations used to define the components of loop B.

Referring to loop A, a common discharge line 17 is fed by both the secondary coolant discharge line 13 through branch line 17' and the blowdown discharge line 11 through branch line 17". A heat exchange means 19 is provided in common discharge line 17, such as a shell and U-tube design heat exchanger, the heat exchanger 19 receiving cooling water, from a supply thereof, through line 21 which is then discharged from the heat exchanger 19 through line 23. A bypass line 25, has a valve means 27, such as a gate valve, provided in the bypass line 25. The bypass line 25 is provided to receive fluid from a connection 29 in common discharge line 17 upstream of the heat exchanger 19 and return the fluid back to common discharge line 17 at a connection 31 downstream of the heat exchanger 19.

A pump means 33, such as a motor driven pump is located in line 17 upstream from the heat exchange means 19, and a miniflow line 35 is provided for the pump 33, which miniflow line 35 contains a heat exchanger 37.

The common discharge line 17, at a location downstream from the heat exchanger 19 and connection 31 of the bypass line 25, divides into two branch feedlines 39 and 41. Branch feedline 39 returns secondary coolant from common discharge line 17 back to steam generator $S_1$, by connection 43, with the main feedwater line 3 at a location between the main check valve 5 and emergency feedwater line 7, while branch feedline 41 returns secondary coolant from common discharge line 17 back to steam generator $S_2$, by connection 45, with the respective main feedwater line 3 at a location between the main check valve 5 and emergency feedwater line 7 thereof.

Cross-connecting lines are provided to integrate the pair of loops A and B, the first cross-connecting line 49 connecting common discharge line 17 of the two loops upstream of pump 33, and the second cross-connecting line 51 connecting the common discharge lines 17 downstream of the connection 31 of bypass line 25. These cross-connecting lines 49 and 51 contain valve means 53, such as manual valves. A pump bypass line 55 is provided containing a valve means 57 for use in bypassing the pump 33.

Various valves are provided throughout the system to designate the desired flow for secondary coolant treatment. Valve means 59, such as air operated globe valves, are provided in the secondary coolant discharge line 13, which valves are normally closed and are opened when the steam generator recirculating system is used as a high pressure heat removal system. These valves 59 have local control capability, fail closed, are located outside the containment c, and are considered as the containment isolation barrier. Valve means 61, such as air operated globe valves, are provided in the blowdown discharge line 11. These valves 61 are normally open when the steam generator recirculation system is used as a blowdown water purification system. They fail closed, and act as a conventional blowdown isolation valve. A motor operated gate valve 63, in common discharge line 17, adjacently downstream of the pump 33 acts as a pump discharge valve. Valve 63 is normally closed and opened when the pump is required to operate. It also prevents the steam generator blowdown flow from flowing through the pump 33 and directs it through bypass line 55. Valve 63 also acts as a pump isolation and maintenance valve. A valve 65 is also provided in the common discharge line 17 between the heat exchanger 19 and the connection 31 of bypass line 25.

Motor operated gate valves 67, in each of the branch feedlines 39 and 41 are normally closed, and opened when the steam generator recirculating system is used for heat removal and wet-layup operations, which valves isolate the system from the steam generators and the main feedwater lines 3, and act as the return line containment isolation barrier. Additional air operated globe valves 69 are located in branch feedlines 39 and 41 to split the flow leaving the heat exchanger 19, into the original magnitude back to the two steam generators $S_1$ and $S_2$. These valves 69 are used during hot standby and wet-layup operations.

Check valves 71 are located in branch discharge line 17' and 17" to prevent the backflow of secondary coolant from one steam generator into another should a steam generator depressurization occur. Check valves 73 are also provided in both of the branch feedwater lines 39 and 41 which serve to prevent main or emergency feedwater loss through a break affecting the steam generator recirculation system.

The steam generator blowdown processing system, as is conventional, includes a line 75 which includes a demineralizer 77 and a storage tank 79, the line 75 leading back to the feedwater system which returns feedwater through main feedwater lines 3.

In an embodiment where the steam generator recirculating system is to be used as a steam generator water purification system, a purification means, such as an electromagnetic filter 81 may be introduced which connects with common discharge line 17. A valve 83 is provided in common discharge line 17 which, when closed, will direct flow from the pump 33 through inlet line 85 containing a valve 87 to the electromagnetic filter 81 and then through return line 89 containing valve 91 back to the common discharge line 17 following purification.

The steam generator recirculation system 1 is usable for a number of alternative purposes. Under normal operation of the nuclear steam supply system, the system may be used as a steam generation blowdown cooling system. For such usage, the steam generator blowdown will pass through branch line 17' or 17" to the common discharge line 17, through opened valve 57 and pump bypass line 55, through the heat exchanger 19 and then to offtake line 75, demineralizer 77 and tank 79 and back to the feedwater system. During such operation, the valve 59 in secondary coolant discharge line 13, pump discharge gate valve 63, bypass valve 27 in bypass line 25, valve 65, and gate valve 67 in branch feedlines 39 and 41 are all in closed position.

Under normal operating conditions, the system may also be used as a steam generator water purification system by means of an electromagnetic filter. For such usage, the steam generator blowdown discharge branch line 17' or 17" is used to direct about 10 percent of the feedwater flow, or more, of the secondary coolant from the steam generators to common discharge line 17. The pump 33 is activated and, with valve 83 closed, the flow will be directed through open valve 87 in line 85 to the electromagnetic filter 81 for purification, then through line 89, with valve 91 open, back to the common discharge line 17. The resultant purified stream is directed through bypass line 25, with valve 27 in open position and valve 65 in common discharge line 17 closed, and then through branch feedlines 39 and 41 back to the steam generators $S_1$ and $S_2$, through open valves 67. The desired magnitude of flow to each steam generator $S_1$ and $S_2$ is controlled by valves 69. If some blowdown of the steam generators is also necessary due to the level of dissolved impurities, the required amount of secondary coolant is diverted, downstream of the electromagnetic filter 81, the diverted blowdown flow cooled by passage through the heat exchanger 19 and passed to offtake line 75 for treatment in demineralizer 77, and passage to tank 79. In the purification mode, valves 59 and 61 would be open, and valve 57 in pump bypass line 55 would be closed. When the pump 33 is operating, a small flow is diverted, through line 35 to miniflow heat exchanger 37 for pump protection.

When the steam generator recirculation system 1 is to be used as a means for removing the decay heat generated in a nuclear core, and the sensible heat from the core, during a cooldown, a primary function of the system, the secondary coolant discharge lines 13 are used. With valves 59 in secondary coolant discharge line 13 opened, and with control of flow therethrough, secondary coolant is directed through branch discharge line 17' and 17" to common discharge line 17. The flow of secondary coolant is directed through pump 33, heat exchanger 19, where it is cooled to a predetermined level, and the cooled secondary coolant then returned through open valve 65, in common discharge line 17. The cooled secondary coolant flows through open valves 67 in branch feedline 39 and 41, with flow control affected by means of valves 69, back to the steam generators. Availability of this system is enhanced by cross-connecting lines 49 and 51 which enable the use of the heat exchanger of the other loop if necessary. For example, if the heat exchanger 19 of loop A is unavailable (maintenance, etc.) and use of the system in servicing steam generator $S_1$ and $S_2$ is desired, the flow in common discharge line 17 of loop A can be directed through open valves 53 of first connecting line 49 to the common discharge line 17 of loop B, passed through its pump 33 and heat exchanger 19 and, after cooling, returned through second cross-connecting line 51 with valves 53 open, back to common discharge line 17 of loop A for passage to branch lines 39 and 41 and then back to steam generators $S_1$ and $S_2$.

The use of the bypass line 25 and valve 27, which can be used to monitor and control flow through the bypass of heat exchanger 19 enables the maintenance of a constant total return flow to the branch feedlines 39 and 41. This maintenance of constant flow prevents, by providing mixing of cooled secondary coolant from heat exchanger 19 and uncooled secondary coolant from bypass line 25, the thermal shock that would be associated with a steam generator receiving only cooled secondary coolant directly from the heat exchanger 19.

The use of the steam generator recirculation system provides a means for removing the decay heat generated in the nuclear steam supply system and to maintain the plant at hot standby for an indefinite period of time. Its use provides for a reduction in the quantity of makeup water necessary to maintain the plant or hot standby condition.

The present system also minimizes the activity released to the atmosphere in the event of a steam generator tube rupture or tube leakage. Under such conditions, the affected steam generator is isolated. Cooling of the reactor is performed by the other intact steam generators. However, some means must be provided to cool down the affected steam generator, and rather than possible release of radioactive steam into the atmosphere, the steam generator circulating system can be valved into service at any time during cooldown.

By use of the present system, with the heat exchanger 19 and bypass line 25, the flow and temperature of auxiliary feedwater is increased, and the potential for feedwater line cracking reduced. It is recognized that the operations contributing mostly to the process of main feedwater line cracking are the injections into the hot steam generator of cold feedwater during heatup, cooldown, hot standby or low power operation. Under these conditions, the feedwater lines experience thermal stratification and steady state thermal oscillation, resulting in a fatigue mechanism of the feedwater piping. To avoid this mechanism, it has been recommended that the feedwater temperature remain above specified temperatures and flow rates. The present system can be used to prevent the direct makeup of cold water into the steam generators by removing heat through the heat exchanger 19 and by providing the feedwater lines with high flow and high temperature deaerated water. When it is necesssary to adjust the steam generator secondary coolant level, the makeup of cold auxiliary feedwater is mixed with the recirculated flow, thereby preventing the potential corrosion problems associated with low flow, cold water injections.

The present system also minimizes radiation exposure during plant cooldown. In the event of an accident leading to reactor coolant system activity, the plant operator may restrict the use of the conventional residual heat removal system in order to limit activity circulating outside the containment. Under these conditions, the steam generator recirculating system is a means to perform the needed cooldown without exceeding imposed limitations.

The steam generator recirculating system increases plant availability by reducing the steam generator cooldown time. During the last phase of a plant cooldown when the reactor coolant system is under residual heat removal system control, and the steam generators almost totally depressurized but still hot, the present system provides a means to reduce the steam generator cooldown time. This is especially important when maintenance is planned on the steam generators.

The present system can also be used to maintain recirculation through the steam generators for chemistry control during wet layup conditions. During a refueling period, or other inactive periods when the steam generator must remain protected from corrosive attack, the system will assume the thorough mixing of the chemicals inside the steam generators, through continual circulation, resulting in an homogeneous wet layup condition.

The present system can also be used for the recovery of a hot, dry steam generator. The injection of cold auxiliary feedwater into a hot, dry steam generator imposes a severe thermal transient on the steam generator due to the large temperature difference between the hot steam generator parts and the cool water. In addition, depending on the service history of the individual steam genertor, some structural degradation could have previously occurred reducing the capability for withstanding large thermal stresses. In order to correct this situation, the present system can be used to feed the hot, dry steam generator with warm water from the other steam generators. Thus, the system will maintain the thermal stresses within tolerable limits.

In addition, as aforementioned, the system during normal power operation provides the flow paths, flow metering and cooldown capability for steam generation blowdown flow.

Also, as aforementioned, the steam generator recirculating system can incorporate a water purification means, and provides the flow paths necessary for incorporation of an electromagnetic filter.

If desired, in connection with the four loop nuclear reactor steam supply system, and in order to provide redundancy to the steam generator recirculating system, a supplemental common discharge line could be provided. In such an alternate embodiment, not shown in the drawings, a supplemental common discharge line would be inserted between cross-connecting lines 49 and 51, which supplemental common discharge line would be added in parallel with the existing line 17 shown, the supplemental common discharge line containing a pump, with its bypass, a heat exchanger, with its bypass, and the valving needed to direct the flow of secondary coolant, or a portion of the flow of secondary coolant, through the supplemental discharge line. By use of two such common discharge lines in a recirculation loop, different pumps, such as one an electrical motor driven pump and the other a diesel pump could be used, one in each of the common discharge lines, with cross-connecting lines provided between all of the common discharge lines. With such an arrangement, each of the pumps could be sized to process fifty percent of the flow required to meet the desired conditions. Also, in the event of a power failure, the diesel pumps could be activated and used to serve the steam generators through recirculation of secondary coolant therethrough. One pump would be allocated to each steam generator. This diversity of pumps is used as an additional safety factor.

Figure 2:
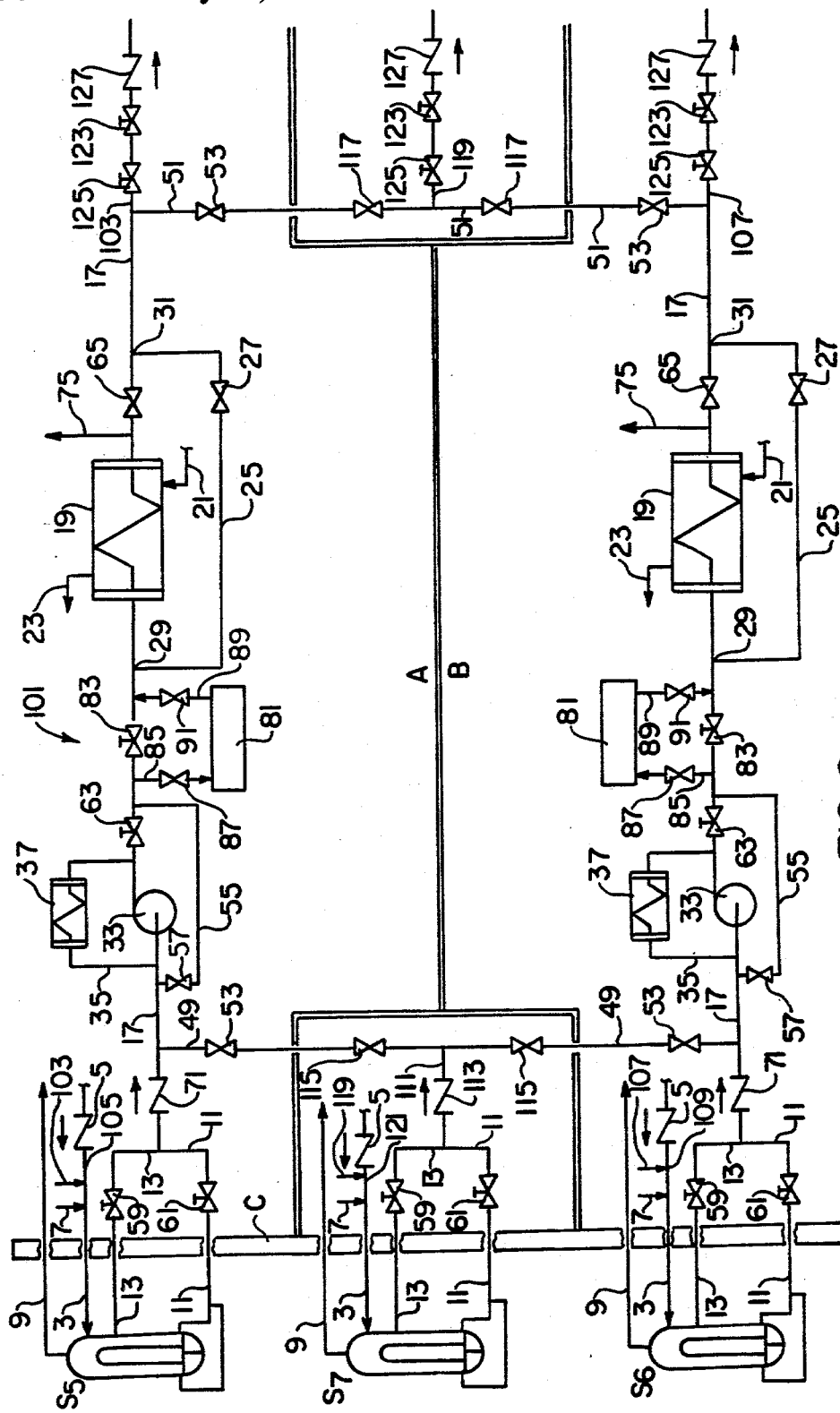
FIG. 2 is a schematic illustration of an embodiment of the steam generator recirculating system of the present invention for use with a pressurized water reactor plant having three steam generators.

In the embodiment of FIG. 2, the present steam generator recirculating system is schematically illustrated for use with a three loop generator arrangement. In a three loop steam generator arrangement, three steam generators, such as $S_5$, $S_6$ and $S_7$ are used with a pressurized water reactor. The steam generator recirculating system 101 comprises two separately located loops A and B. The components of loop A service steam generator $S_5$ and the components of loop B service steam generator $S_6$. Steam generator $S_7$ is serviced by either loop A or loop B, as shown. Since the components of the separate loops A and B contain primarily the components described in connection with the embodiment of FIG. 1, the same numeral designations for those components are used. Referring to loop A, blowdown from blowdown discharge line 11 and from secondary coolant discharge line 13, of steam generator $S_5$, pass to common discharge line 17, which contains pump 33, heat exchanger 19 and bypass line 25. The secondary coolant is discharged from common discharge line 17 to branch feedline 103 which then recirculates the same to main feedwater line 3 of steam generator $S_5$ at connection 105. In loop B, the discharge of secondary coolant from common discharge line 17 is through branch feedline 107 which connects with main feedwater line 3 of steam generator $S_6$ at 109.

From steam generator $S_7$, the blowdown discharge line 11 and secondary coolant discharge line 13 pass to a branch discharge line 111, containing check valve 113, the branch discharge line 111 discharging into the first cross-connecting line 49 between common discharge lines 17 of loop A and loop B, with valves 115 provided to regulate flow therethrough. Downstream from the heat exchanger 19, and connection 31 of bypass 25, the second cross-connecting line 51, contains additional valves 117 which control flow of secondary coolant as desired from common discharge lines 17 of loops A and B to a branch feedline 119. Branch feedline 119 recirculates secondary coolant to steam generator $S_7$ by connection with its main feedwater line 3 at 121. Motor operated valves 123, air operated globe valves 125 and check valves 127 are provided in each of the branch feedlines 103, 107 and 119.

Figure 3:
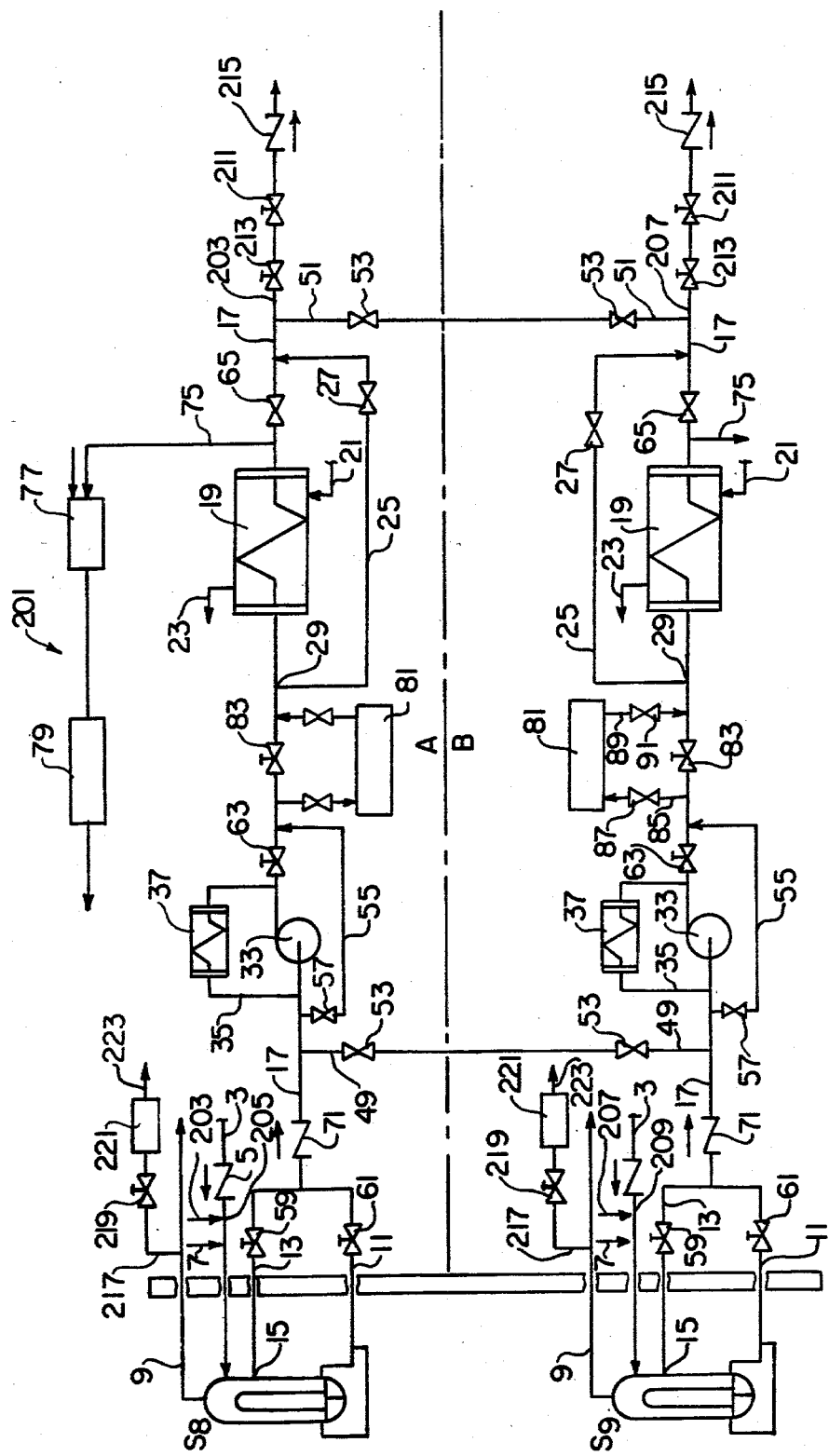
FIG. 3 is a schematic illustration of an embodiment of the steam generator recirculating system of the present invention for use with a pressurized water reactor plant having two steam generators, and including a quench tank for steam or saturated liquid released from a main steamline of the steam generator.

FIG. 3 illustrates an embodiment of the steam generator recirculation system for use with a two loop steam generator arrangement. The steam generator recirculation system 201 provides two recirculation loops A and B for servicing of two steam generators $S_8$ and $S_9$. Referring to loop A, and as with the previous embodiments described, the steam generator has a secondary coolant discharge line 13 and a blowdown discharge line 11. These two lines discharge into a common discharge line 17 which contains a pump 33 and heat exchanger 19. Bypass line 25 is provided two bypass the heat exchanger, when desired. The loop also contains the pump miniflow line 35, pump bypass line 55, an optional secondary coolant purifier 81, and offtake line 75 which leads to the blowdown processing system. The associated valving is also provided, as described in the previous embodiments. The common discharge line 17 of loop A, following the cross-connecting line 51, returns secondary coolant back to the main feedwater line 3 of steam generator $S_8$, through branch feedline 203 which connects with main feedline 3 at connection 205 between the main check valve 5 and emergency feedwater line 7. The common discharge line 17 of loop B, following the cross-connecting line 51, returns secondary coolant back to the main feedwater line 3 of steam generator $S_9$, through branch feedline 207 which connects with main feedline 3 at connection 209 between the main check valve 5 and emergency feedwater line 7. A motor operated valve valve 211, air operated globe valve 213, and check valve 215 are provided in each branch feedline 203 and 207, as are the valves in the branch feedlines of the previously described embodiments.

In the embodiment of FIG. 3, a further improvement is illustrated relative to the steamline 9. In conventional operation of such steamlines, a pressure relief valve is generally provided so as to release steam to the atmosphere in the event of a need to cooldown the steam generator. Since, in some instances, such steam or saturated liquid could contain radioactive components, such as release is undesirable. In the present system, an offtake line 217 is provided which leads from main steamline 9, and the pressure relief valve 219 will discharge steam from the steam generator $S_8$ or $S_9$, through offtake line 217 into a quench tank 221 containing water. The quench tank 221 can be used merely to absorb the steam which is then treated separately, or the quench tank water may be cooled through heat exchanger 19 and passed to the demineralizer 77 such as through line 223 to line 17 at suction of pump 33, through heat exchanger 19 and then to the demineralizer 77 which will remove radioactive components, to the storage tank 79 and recycled back to the main feedwater line 3 of the steam generator.

The present steam generator recirculating system, as disclosed, can be used for a number of purposes, the primary purpose being for recirculating cooling of secondary coolant for return to the steam generator. It is also usable, however, as described, as part of the blowdown system of the steam generators, and as a water purification system therefore.

What is claimed is:

1. A steam generator recirculating system for the recirculation of secondary coolant, for use with the nuclear steam supply system of a pressurized water nuclear reactor plant having at least two steam generators, main feedwater lines to each said steam generator and a blowdown system for each said steam generator, comprising:
    a discharge line for receipt of a minor portion of secondary fluid for each steam generator;
    a blowdown discharge line from each steam generator;
    a pair of recirculating loops for receipt of a minor portion of the secondary coolant from at least one steam generator and return of said portion to the main feedwater line thereof, each loop having:
    (a) a common discharge line into which the secondary coolant discharge line and blowdown discharge line from at least one steam generator feeds;
    (b) a heat exchanger in said common discharge line;
    (c) a pump means in said common discharge line upstream from said heat exchanger;
    (d) a bypass line communicating with said common discharge line for bypassing said heat exchanger; and
    (e) means for returning secondary coolant after passage through said common discharge line, back to the main feedwater line of the steam generator.

2. A steam generator recirculating system for the recirculation of secondary coolant, as defined in claim 1 including a pump miniflow line containing a second heat exchanger for protection of said pump.

3. A steam generator recirculating system for the recirculation of secondary coolant as defined in claim 1 including a water purification means communicating with said common discharge line.

4. A steam generator recirculating system for the recirculation of secondary coolant as defined in claim 3 wherein said water purification means comprises an electromagnetic filter, and said electromagnetic filter communicates with said common discharge line between said pump and said bypass line.

5. A steam generator recirculating system for the recirculation of secondary coolant as defined in claim 1 wherein a steam generator blowdown processing system is provided, and a line connecting with said common discharge line downstream of said heat exchanger communicates with said processing system.

6. A steam generator recirculating system for the recirculation of secondary coolant as defined in claim 1 wherein the steam generator contains a main steam discharge line and an offtake line is connected to said main steam discharge line, with pressure relief means provided to discharge steam into said offtake line, and a quench tank is provided into which steam from said offtake line is discharged.

7. A steam generator recirculating system for the recirculation of secondary coolant as defined in claim 6 wherein a steam generator blowdown processing system is provided, and a line connecting within said common discharge line, downstream of said heat exchanger, communicates with said processing system, and said processing system contains a demineralizer and a storage tank, and a discharge line is provided from said quench tank to said demineralizer for treatment of fluid from said quench tank.

8. A steam generator recirculating system for the recirculation of secondary coolant as defined in claim 1 wherein four steam generators are provided, with the secondary coolant discharge lines and blowdown discharge lines to two of said steam generators feeding a said common discharge line of each of said pair of recirculating loops.

9. A steam generator recirculating system for the recirculation of secondary coolant as defined in claim 8 wherein said means for returning secondary coolant comprises a plurality of branch feedlines connected to said common discharge line, for return of said secondary coolant from the common discharge line to said two steam generators, and valve means are provided in each said branch feedline to control the flow of secondary coolant therethrough.

10. A steam generator recirculating system for the recirculation of secondary coolant as defined in claim 9 wherein said branch feedlines communicate with the main feedwater line between a check valve in each main feedwater line and an emergency feedwater line to each main feedwater line.

11. A steam generator recirculating system for the recirculation of secondary coolant as defined in claim 10 including first and second cross-connecting lines between the common discharge lines of said pair of recirculating loops, the first cross-connecting line upstream of said pumps and the second cross-connecting line downstream of said bypass lines.

12. A steam generator recirculating system for the recirculation of secondary coolant as defined in claim 1 wherein four steam generators are provided, and wherein two common discharge lines are provided in each loop, with the discharge lines and blowdown discharge lines of each steam generator feeding one of said common discharge lines, and wherein the pump means is one of said two common discharge lines is an electrical motor driven pump and the pump means in the other of said two common discharge lines is a diesel motor driven pump.

13. A steam generator recirculating system for the recirculation of secondary coolant as defined in claim 12 including cross-connecting lines between all of said common discharge lines.

14. A steam generator recirculating system for the recirculation of secondary coolant as defined in claim 1 wherein three steam generators are provided, with respective secondary coolant discharge lines and blowdown discharge lines of two said steam generators feeding separate common discharge lines, and the secondary coolant discharge and blowdown discharge line of the third steam generator feeding both said separate common discharge lines, and valve means are provided to control flow from said third steam generator to both said separate common discharge lines.

15. A steam generator recirculating system for the recirculation of secondary coolant as defined in claim 14 wherein said means for returning secondary coolant compises three branch feedlines one of which leads to the main feedwater line of each of said three steam generators, and a cross-connecting line is provided between said separate common discharge lines, with valve means provided to control the flow of secondary coolant from said separate common discharge lines to each said three branch feedlines.

16. A steam generator recirculating system for the recirculation of secondary coolant as defined in claim 1 wherein two steam generators are provided, with the secondary coolant discharge line and blowdown discharge line of each steam generator feeding a common discharge line of each of said pair of recirculating loops.

17. A steam generator recirculating system for the recirculation of secondary coolant as defined in claim 8 wherein said means for returning secondary coolant comprises a branch feedline connected to each common discharge line for return of secondary coolant to each steam generator, and valve means are provided in each said branch feedline to control the flow of secondary fluid therethrough.

18. A steam generator recirculating system for the recirculation of secondary coolant as defined in claim 17 wherein said branch feedlines communicate with the main feedwater line between a check valve in each main feedwater line and an emergency feedwater line to each main feedwater line.

19. A steam generator recirculating system for the recirculation of secondary coolant as defined in claim 18 including first and second cross-connecting lines between the common discharge lines of each of said pair of recirculating loops, the first cross-connecting line upstream of said pump and the second cross-connecting line downstream of said bypass lines.

* * * * *